United States Patent [19]

Eberle

[11] 4,363,593
[45] Dec. 14, 1982

[54] APPARATUS FOR POSITIONING BATTERIES AND HOISTING BATTERIES INTO A BATTERY FORMATION TUB

[75] Inventor: William J. Eberle, Reading, Pa.

[73] Assignee: General Battery Corporation, Reading, Pa.

[21] Appl. No.: 66,798

[22] Filed: Aug. 15, 1979

[51] Int. Cl.³ .............................................. B66F 11/00
[52] U.S. Cl. .................................. 414/592; 414/786; 294/87 R; 294/63 A; 198/419; 193/35 A
[58] Field of Search ............... 414/564, 110, 111, 592, 414/786; 29/730; 193/35 A, 35 R; 294/63 A, 90, 99, 87 R; 198/721, 418, 419, 431, 426, 459, 460

[56] References Cited

U.S. PATENT DOCUMENTS

| | | | |
|---|---|---|---|
| 2,470,795 | 5/1949 | Socke | 198/419 X |
| 2,784,997 | 3/1957 | Baumann | 294/63 A |
| 2,819,806 | 1/1958 | Vieth | 29/730 |
| 3,347,587 | 10/1967 | Frost | 294/87 R |
| 3,514,001 | 5/1970 | De Merritt et al. | 193/35 R X |
| 3,574,386 | 4/1971 | Frost | 294/87 R |
| 3,592,325 | 7/1971 | Sullivan | 198/721 |
| 4,018,324 | 4/1977 | Kamphues | 198/419 |
| 4,197,046 | 4/1980 | Shank | 198/419 |

FOREIGN PATENT DOCUMENTS

| | | | |
|---|---|---|---|
| 102521 | 7/1963 | Norway | 294/63 A |
| 565851 | 5/1975 | U.S.S.R. | 193/35 A |

Primary Examiner—John J. Love
Assistant Examiner—L. E. Williams
Attorney, Agent, or Firm—Benasutti Associates, Ltd.

[57] ABSTRACT

An apparatus for forming and transferring a matrix arrangement of batteries which has two interrelated parts. A matrix-forming device which receives a plurality of batteries therein on base rollers space the batteries and which arranges the batteries on the base rollers into a matrix of rows of batteries. Pivoted spacing rollers from the battery adjacent thereto, and a shuttle moves the batteries transversely across the base rollers. Limit switches are provided to control the movement of the shuttle. Secondly, a transfer frame fits within the matrix-forming device, and fits around and expands tightly against the batteries in the matrix-forming device to hold the batteries tightly on at least two sides thereof. The transfer frame is adapted to to lifted so that the batteries may be lifted from the matrix-forming device in their matrix formation.

14 Claims, 3 Drawing Figures

APPARATUS FOR POSITIONING BATTERIES AND HOISTING BATTERIES INTO A BATTERY FORMATION TUB

BACKGROUND OF THE INVENTION

The present invention generally relates to an apparatus for use in conjunction with lead-acid storage battery formation, and in particular, relates to an apparatus for moving batteries being transported along a conventional battery assembly line and arranging those batteries into a matrix and subsequently transporting the matrix of batteries into a battery formation tub.

During formation of lead-acid storage batteries in forming tubs, it is necessary to position the various batteries being formed into a matrix formation with sufficient space between the batteries to allow the cooling fluid within the formation tank to circulate freely about the battery in order to provide a sufficient cooling action. Such an arrangement of the batteries can, of course, be accomplished by hand positioning of the batteries in the forming tubs. However, such an operation is both time consuming and requires much manual labor.

SUMMARY OF THE INVENTION

It is, therefore, a primary objective of the present invention to provide an apparatus which can receive batteries being transported on a conventional battery conveyor line and sort and position those batteries into a matrix configuration substantially the same as the matrix configuration required in the formation tub.

Further, it is an object of the present invention to provide an apparatus which can transport the batteries arranged in the required matrix formation from the matrix-configuring apparatus to the formation tub wherein the batteries will be formed with cooling fluid therearound.

In this apparatus for forming and transferring matrix arrangement of batteries, there are essentially two distinctive parts. The first part is the matrix-forming device which receives a plurality of batteries onto base rollers from a battery conveyor. Once in the device, a shuttle moves the batteries transversed to the direction of the rollers which then carry the batteries in the direction transverse to the shuttle. The movement of the shuttle is controlled by limit switches. Pivoted spacing rollers interspersed among the base rollers space each of the batteries from the battery adjacent thereto. The second device which works directly with the matrix-forming device is a transfer frame which fits within the matrix-forming device and fits between rows of the battery matrix. The transfer frame is designed to expand tightly against the batteries to hold them tightly in their matrix-formation. With the batteries tightly held, the transfer frame is adapted to be lifted and move the matrix of batteries in its entirety.

BRIEF DESCRIPTION OF THE DRAWINGS

Further objects and a better understanding of the present invention will be gained from the following detailed description of the invention taken in conjunction with the formal drawings, wherein.

DETAILED DESCRIPTION OF THE INVENTION

Figure 1:
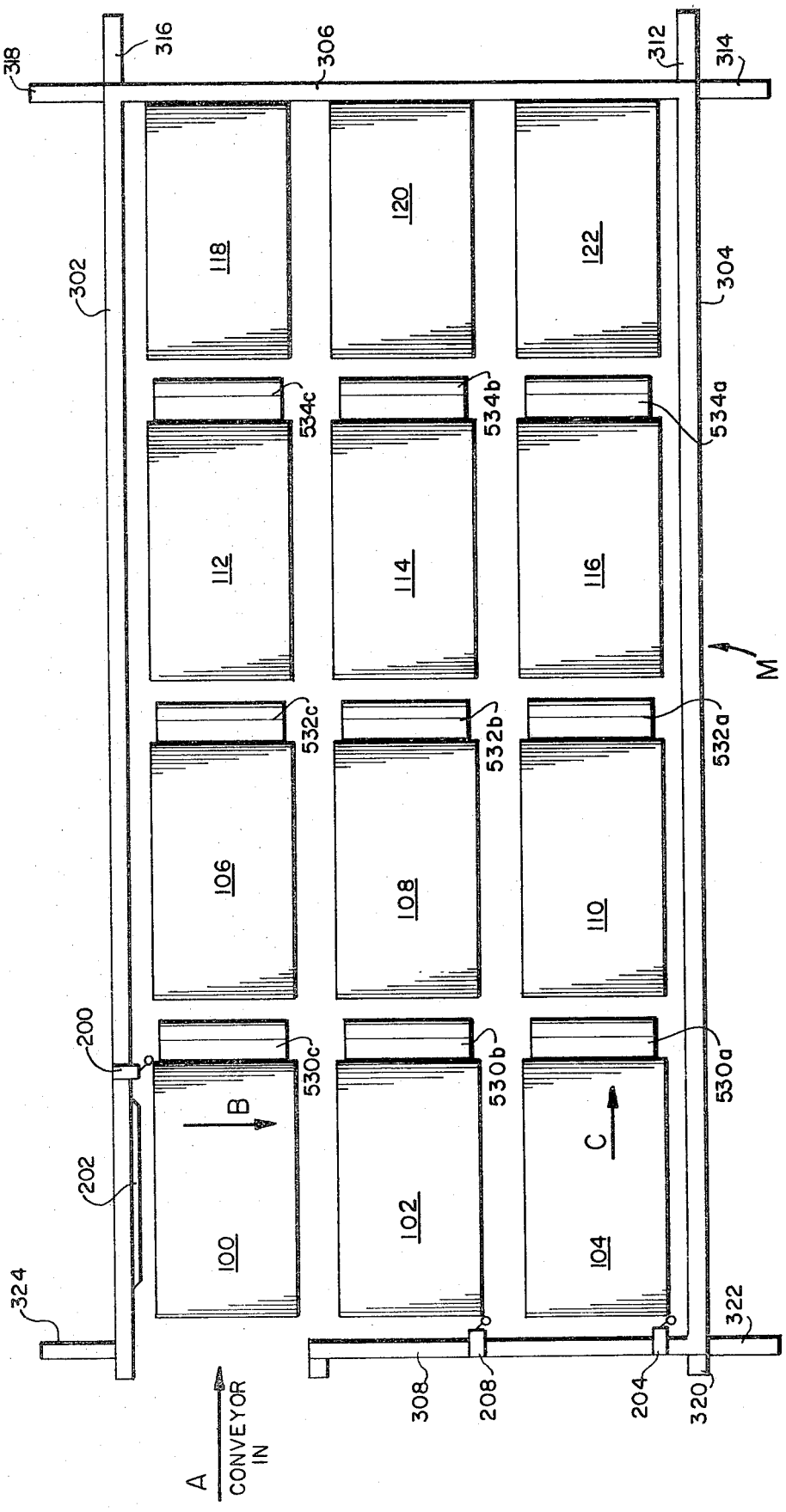
FIG. 1 is a top view of the matrix-forming apparatus of the present invention.

Although specific forms of the invention have been selected for illustration in the drawings, and the following description is drawn in specific terms for the purpose of describing these forms of the invention, this description is not intended to limit the scope of the invention which is defined in the appended claims.

Figure 2:
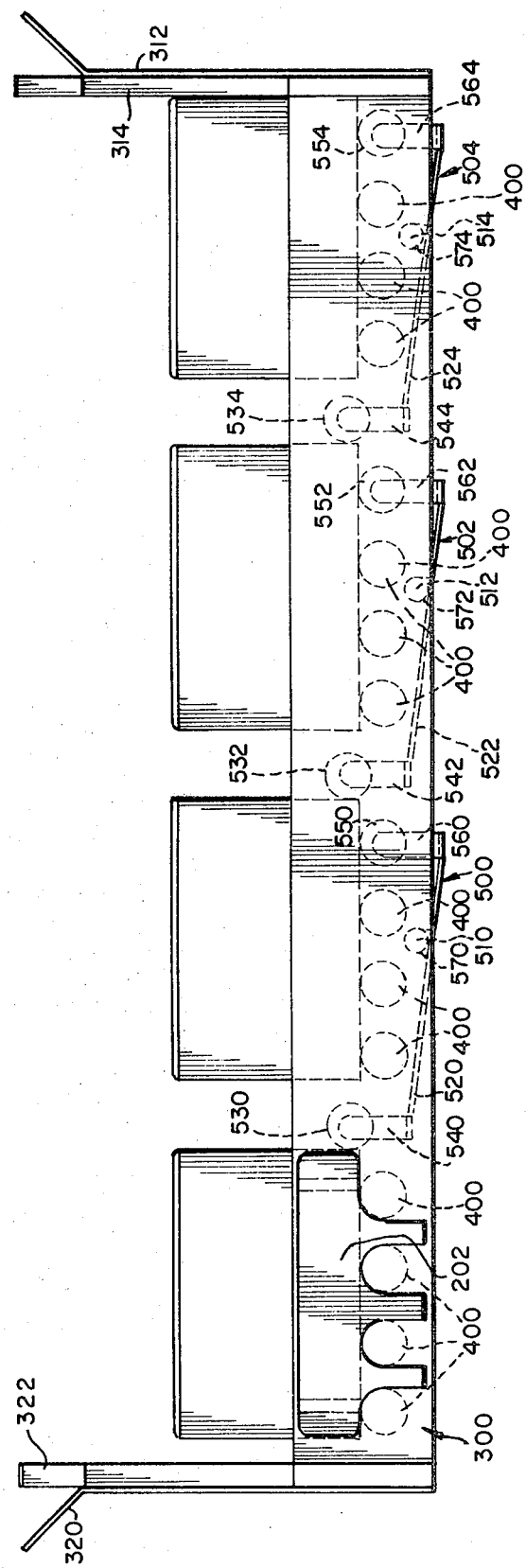
FIG. 2 is a side view of the matrix-forming apparatus of the present invention.

The device for arranging the batteries into the desired matrix formation is shown in FIGS. 1 and 2 and is generally denoted by M. These two figures provide both a top and a side view of the preferred embodiment.

Referring to FIG. 1, the top view, batteries on a conventional battery production line conveyor are sequentially introduced into the apparatus in the direction indicated by arrow A. Each of the batteries entering the apparatus reaches a first position as shown by battery 100. In this position, the battery activates a limit switch 200 which in turn activates a shuttle plate 202 which pushes the battery in the position of battery 100 in the direction of arrow B. The shuttle plate 202 moves the battery to the furthest unoccupied position (that occupied by battery 104) within the apparatus in the direction of arrow B.

As is seen from the side view in FIG. 2, the preferred embodiment generally comprises a frame designated as 300. Within the frame 300 are a plurality of rotatably mounted elongated powered rollers 400 spanning the distance between the sides 302 and 304 of the frame. After the limit switch 200 has been tripped and the shuttle 202 has forced the battery into the position occupied by battery 104 in FIG. 2, the powered rollers 400 automatically cause the battery in that position (104) to move downward in the direction of arrow C toward the direction of battery 122.

In addition to the powered rollers 400, the matrix-forming apparatus 100 comprises a plurality of see-saw or pivotally mounted roller assemblies 500 which are used to position and space the various batteries in their appropriate positions. As shown in the side view (FIG. 2), three pivotal lever roller assemblies 500, 502 and 504 are provided in this embodiment. Each of these roller assemblies has a pivot point created by pivot shafts 510, 512 and 514 respectfully. Lever arms 520, 522 and 524 are mounted on these pivot shafts. Stop rollers 530, 532 and 534 are mounted on one end of the lever arms on stop roller supports 540, 542 and 544 respectfully. At the opposite end of the lever arms are actuating rollers 550, 552 and 554 which are mounted on actuating roller supports 560, 562 and 564 respectfully. The various lever arms 520, 522 and 524 are fitted onto bearing supports 570, 572 and 574 through which are journeled the pivot shafts 510, 512 and 514. In the side view, the lever assemblies are mounted so that the actuating rollers 550, 552 and 554 are closer to the actual pivot point of the assembly than are the corresponding stop rollers 530, 532 and 534 on the same lever arm. Accordingly, when none of the batteries have been introduced into the apparatus, the stop rollers 530, 532 and 534 drop into a position about the shafts wherein they are flush with the top of the powered rollers 400. On the other hand, the actuating rollers 550, 552 and 554, when there are no batteries in the apparatus, take the position wherein they protrude above the surface of the powered rollers 400. However, the distance which the actuating rollers protrude above the powered rollers in their relaxed condition is not greater than the distance of the radius of those rollers. Therefore, when a battery is forced in the direction of arrow C by the powered rollers, the leading edge of the battery will tend to successfully force each of the actuating rollers which it encounters downward into the position shown in the side view (FIG. 2). Thereby, each of the perspective stop rollers 530, 532 and 534 is pivoted above the level of the powered rollers by a distance not more than the radius of those stop rollers. When the stop rollers are pivoted to this position, any succeeding batteries are prevented from travelling further on the powered rollers, thereby preventing them from engaging the previously rolled battery.

Specifically in the top view (FIG. 1) during the initial loading process, the battery which has been introduced at the position of battery 100 moves to the location of battery 122. In this position, the stop roller 534a is pivoted upward due to the weight of the battery in position on top of roller 554. At this point, with the roller 534a in its raised position, the next battery introduced into the apparatus stops in the position of battery 116 since it will abut the raised stop roller 534a in its travels in the direction of arrow C. Correspondingly, battery 116, one in position, will cause stop roller 532a to raise and form a stop for the next battery 110 as it proceeds into the apparatus. Each row of batteries fills up individually until it is only possible for the battery moved by the shuttle 202 to remain in the position as shown by battery 104. With a battery maintained in the position of battery 104, a limit switch 204 will remain in its closed position to signal the shuttle 202 so that it will operate to force the next battery into the apparatus only as far as the position of battery 102, the middle row of the apparatus as shown. In a manner similar to that discussed previously, the batteries in positions 120, 114, 108 and 102 will fill the positions and thereby raise the stop rollers 534b, 532b and 530b. When the battery 102 is in its final resting position, and limit switch 208 will remain closed to, at this point, deactivate the shuttle 202 and allow direct introduction of the batteries into battery positions 118, 112, 106 and 100. When the last battery, battery 100, is stopped by upwardly pivoted roller 530c, a last limit switch 200 will remain closed. This remaining limit switch 200 is operatively connected to the battery conveyor device and when it remains closed after the introduction of the last battery 100 into the apparatus, the conveyor is controlled to prevent the introduction of additional batteries into the matrix-forming apparatus.

After all the batteries have achieved their matrix position, they are ready to be transferred into a standard forming tub for formation. The frame 300 is further adapted to aid in the removal of the arranged batteries therein. As shown in FIGS. 1 and 2, the frame generally has sides 302 and 304 connected to ends 306 and 308. Additionally, however, there are corner guides 312, 314, 316, 318, 320, 322 and 324 fitted to the sides and ends of the frame. These various corner guides extend upward from the frame members over the tops of the batteries and they are outwardly angled at the top ends thereof. These outwardly extending angles at the tops of these corner guides aid in directing the battery transfer frame into position over the batteries, as will be explained hereinafter.

Figure 3:
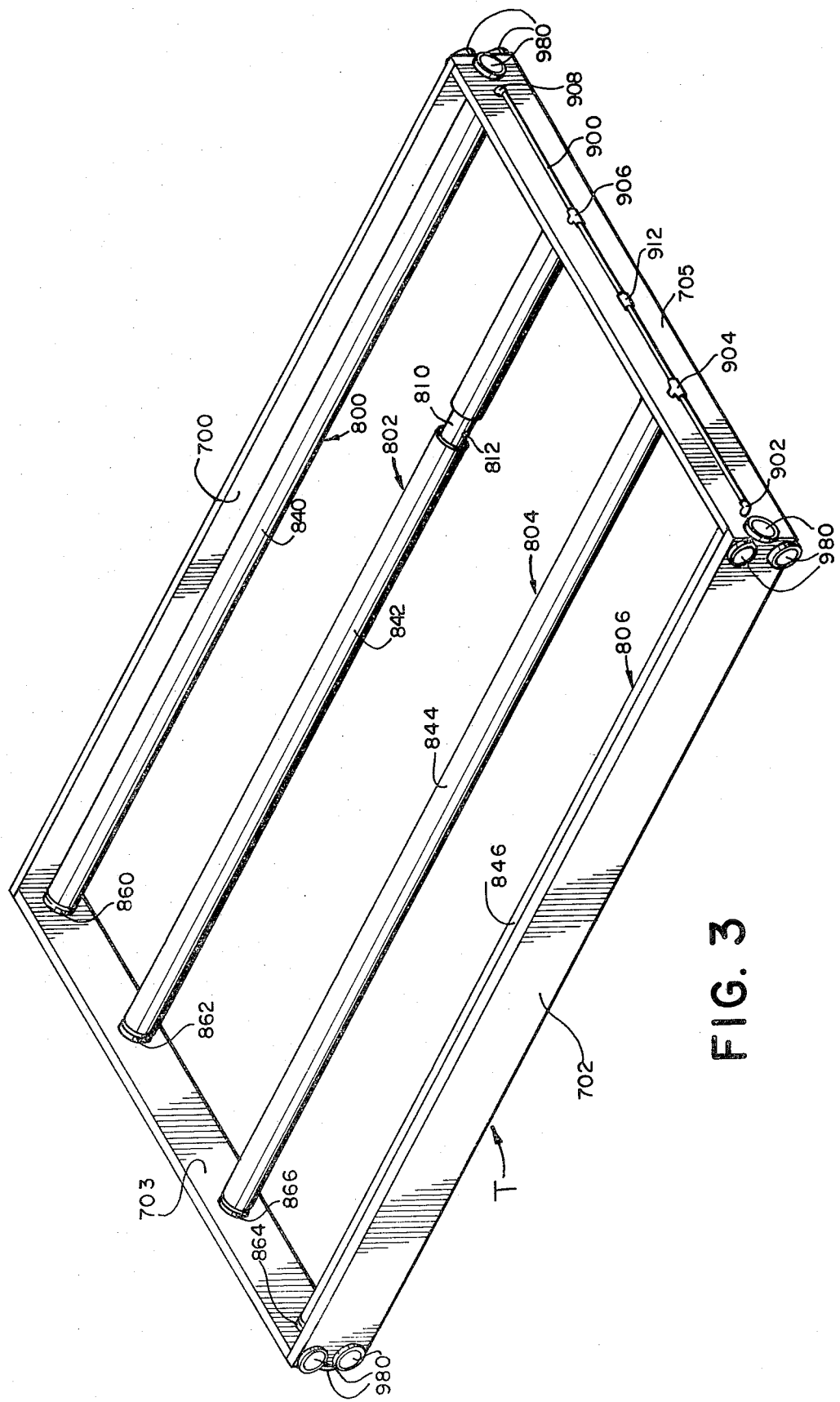
FIG. 3 is a perspective view of the battery transfer frame of the present invention for transporting the batteries arranged by the matrix-forming structure.

In FIG. 3, the battery transfer frame, generally designated T, is shown in perspective with one of the elastomeric tubes extending thereacross cut away for illustrative purposes. The battery transfer frame T is seen to have two parallel sides 700, 702 which are further attached at the ends thereof to end members 703, 705. A plurality of support rods 800, 802, 804 and 806 (one more at all times then the number of rows of batteries to be transferred) span the distance between the end members 703, 705. Each of these support rods has a central support member such as support member 810 shown for rod 802. Each support member is preferably a hollow tub which has a plurality of perforations therethrough, such as the perforation 812 shown in FIG. 3. These support rods are connected at the ends thereof to the end members 703, 705, and are enveloped by the elastomeric tubes 840, 842, 844 and 846. The elastomeric tubes are sealed at their ends by any appropriate sealing means; the sealing means shown in FIG. 2 being restricting bands such as those seen at 860, 862, 864 and 866. In this manner, the elastomeric tubes are sealed at each end around the perforated support rods.

A pneumatic supply line 900 having pneumatic supply fittings 902, 904, 906 and 908 is connected along the outer surface of one of the end members, in this case end member 705. The pneumatic supply fittings fit through the end member and communicate with the interior of the correspondings hollow, perforated support rods on the inside of the end member. By communicating through the end member, air is supplied from the air supply line into the support rods. A fitting 912 is provided in the supply line 900 in order to connect the supply line with a pressurized air source (not shown). When the air source is connected and pressurized air is provided through the supply line into the support rods, the elastomeric tubes 840, 842, 844 and 846 are caused to expand or inflate under the influence of the continuous air supplied thereto.

At each end of the transfer frame 800 are the rotary guide wheels 980. As pointed out previously, the guide wheels fitted at the ends of the frame members are designed to engage the angled portions of the corner guides 312, 314, 316, 318, 320, 322 and 324 in order to easily and effectively position the transfer frame over the batteries arranged in their matrix formation within the matrix-forming apparatus.

The battery frame is utilized by attaching the frame to any suitable hoisting apparatus which will lower the frame downward into the battery matrix-forming apparatus. The precise positioning of the frame being guided as indicated above by interference between the guide brackets on the matrix-forming apparatus and the wheels 980 on the battery transfer frame. Once the transfer frame is in position around the matrix of batteries, the supply of air into the support rods 800, 802, 804 and 806 is initiated to cause the elastomeric tubes there surrounding to inflate and tightly squeeze against the batteries thereinbetween. In this manner, the transfer frame and the batteries held between the inflated tubes can be lifted and transferred to the formation tubs where the matrix of batteries is deposited so that the formation step may begin.

It will be understood that various changes in the details, materials and arrangements of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the U.S. Patent and Trademark Office, and is not intended to limit the scope of the invention described and claimed herein.

What is claimed is:

1. An apparatus for creating and transferring a matrix arrangement of batteries, said apparatus comprising:
   (a) matrix-forming means for receiving, locating and retaining a plurality of batteries therein, said matrix-forming means further comprising:
      (i) a generally rectangular open bottom frame member having an entrance opening for receiving said batteries;
      (ii) a powered base roller means extending transversely between opposite sides of said frame member; and
      (iii) an independent shuttle means positioned adjacent to the battery entrance opening of said frame member, for moving an individual battery on said powered base roller means transversely between opposite sides of said frame member; and
      (iv) pivotable spacing means positioned between each battery for separating each by a uniformly fixed distance from an adjacent battery in a row within said matrix;
   (b) transfer means fittable within said matrix-forming means for fitting around and holding tightly at least two sides of said batteries in said matrix-forming means, said transfer means being adapted to be lifted, whereby lifting said transfer means lifts said batteries from said matrix-forming means in the matrix formation.

2. An apparatus as claimed in claim 1, further comprising limit switch means contactable by said batteries moved by said shuttle means and said base roller means and operatively connected to said shuttle means for controlling the transverse movement of said shuttle means.

3. An apparatus as claimed in claim 2, further comprising guide means connected to said framework means for guiding said transfer means into said framework means.

4. An apparatus as claimed in claim 3, wherein:
   (a) said framework means is comprised of a four-sided frame having two sets of parallel, spaced sides, one of said sides having an opening therein for admitting batteries into said frame; and
   (b) said guide means is comprised of a plurality of upright members at each corner of said four-sided frame, said upright members being angled upward away from said frame and adapted to engage said transfer means.

5. An apparatus as claimed in claim 2, wherein said powered base roller means is comprised of a plurality of stationary mounted, parallel rotary rollers within said framework means.

6. An apparatus as claimed in claim 2, wherein said pivotable spacing means is comprised of:
   (a) at least one pivotally mounted lever arm within said framework means, the distances to each end of said lever arm from the pivot point being unequal;
   (b) a first roller at the end of said lever arm closer to said pivot point;
   (c) a second roller at the end of said lever arm further from said pivot point; and
   (d) said second roller being at substantially the same height as said base roller means and said first roller being slightly higher than said base roller means, whereby a first battery on said roller means passes over said second roller, depresses said first roller, pivots said lever arm, and raises said second roller above the height of said base roller means to stop the further movement of the next battery following said first battery across said base roller means.

7. An apparatus as claimed in claim 1, wherein said transfer means is comprised of:
   (a) an open, four-sided frame;
   (b) a plurality of support rods within said frame and spaced from each other by substantially the width of a battery, the number of support rods being greater by one than the number of rows of batteries parallel to aid rods, and said rods being fittable between rows of said batteries; and
   (c) means surrounding said support rods for expanding against said batteries and holding said batteries tightly thereinbetween.

8. An apparatus as claimed in claim 7, wherein said means for expanding is an inflatable tube surrounding each support rod.

9. An apparatus as claimed in claim 8;
   (a) wherein said support rods are hollow and perforated; and
   (b) further comprising fluid supply means connected to said hollow support rods for supplying fluid thereto to said rods to expand said inflatable tubes theresurroundings.

10. An apparatus as claimed in claim 7, further comprising guide rollers at the corners of said frame for guiding said frame into said matrix-forming means.

11. An apparatus as claimed in claim 1 wherein said matrix-forming means is further comprised of:
    (a) shuttle means located at said entrance opening for moving each said battery transversely with respect to said base roller means.

12. A method for positioning a plurality of elements into a matrix formation and within a four-sided framework, which includes two sets of parallelly spaced sides having an opening therein, for admitting a plurality of said elements comprising the steps of:
    (a) subsequentially introducing said elements through said opening in said framework;
    (b) activating a transfer means for moving respective ones of said elements upon entering said opening in a direction furthest from said opening to form a row along one said side of said framework, and signalling said activating means when said first row formation is completed;
    (c) further activating said transfer means for moving additonal elements in a direction within said framework to form additional rows adjacent, but separate from, the first mentioned formed row, and signalling said activating means as each additional new row is formed;
    (d) disengaging the activating means after the next-to-last row of elements is formed in said matrix within said framework;
    (e) directly introducing said elements within said framework to form said last row and thereby complete said matrix formation.

13. A method for positioning a plurality of elements in accordance with claim 12 including the further step of:

(a) introducing a separator after each said element is positioned in a row of said matrix such that all said elements are in a non-touching relationship.

14. A method for positioning a plurality of elements in accordance with claim 13 including the further step of:
   (a) hoisting said framework including said separated matrix formed elements by inserting inflatable fingers into the separation formed between each row of elements for transferring said elements to a different location.

* * * * *